United States Patent [19]

Henton

[11] Patent Number: 4,879,348

[45] Date of Patent: Nov. 7, 1989

[54] CROSSLINKED AND GRAFTED OVERPOLYMER ACRYLATE RUBBERS

[75] Inventor: David E. Henton, Midland, Mich.

[73] Assignee: The Dow Chemical Company, Midland, Mich.

[21] Appl. No.: 250,577

[22] Filed: Sep. 29, 1988

Related U.S. Application Data

[63] Continuation-in-part of Ser. No. 915,466, Oct. 6, 1986, abandoned.

[51] Int. Cl.$^4$ .................. C08L 51/04; C08F 265/04
[52] U.S. Cl. .................................. 525/305; 525/308; 525/309; 525/902
[58] Field of Search ............... 525/308, 902, 305

[56] References Cited

U.S. PATENT DOCUMENTS

| | | | |
|---|---|---|---|
| 3,671,607 | 6/1972 | Lee | 525/84 |
| 3,830,878 | 8/1974 | Kato et al. | 525/902 |
| 3,944,631 | 3/1976 | Yu et al. | 260/881 |
| 3,992,485 | 11/1976 | Kosugi et al. | 525/308 |
| 4,387,138 | 6/1983 | Gift | 525/902 |
| 4,508,875 | 2/1985 | Kishida et al. | 525/902 |

Primary Examiner—Arman J. Seccuro

[57] ABSTRACT

Overpolymer acrylate rubbers comprising a rubbery alkyl acrylate polymer, an overcoat of a cross-linked and grafted polymer having a Tg value of over about 20° C. and a second overcoat of a grafted but uncross-linked polymer having a Tg value of over about 20° C. provide an exceptional balance of properties when blended to prepare weatherable impact modified thermoplastic molding resins.

12 Claims, No Drawings

CROSSLINKED AND GRAFTED OVERPOLYMER ACRYLATE RUBBERS

CROSS-REFERENCE TO RELATED APPLICATION

This is a continuation in part, of application Ser. No. 915,466 filed Oct. 6, 1986, now abandoned.

BACKGROUND OF THE INVENTION

Overpolymers, prepared by first polymerizing a monomer(s) to a given degree of polymerization and/or particle size, then polymerizing other monomer(s) are known to the art. The polymerization steps can be carried further to yield third and even fourth layers or more. The overpolymer can have hard cores (i.e., high glass transition temperature cores having a Tg value of about 20° C. or higher) or soft cores (i.e., cores having a glass transition temperature of about 0° C. or lower). The glass transition temperatures of the various layers can alternate with respect to the core such that an overpolymer will be comprised of, for example, a hard core, soft shell, and hard overcoat. Relevant U.S. Pat. Nos. disclosing and teaching the preparation of overpolymers are 3,657,152; 3,661,994; 3,793,402; 3,803,264 and 4,082,895.

Patents directed to the use of overpolymers in thermoset and thermoplastic molding compounds are U.S. Pat. Nos. 3,632,679; 3,655,826; 3,661,994; 3,760,035; 3,793,402; and 3,652,722; 3,787,522; 3,833,632; 3,833,683; 3,880,950; 3,887,645; and 3,894,115.

In U.S. Pat. No. 4,082,895 there are disclosed overpolymers comprised of a hard predominantly acrylonitrile monomer core, a rubbery shell, and a hard overcoat. These overpolymers have particular utility as tougheners for thermosetting molding compounds such as phenolic resins, furans, epoxy resins, and unsaturated polyester resins, and for thermoplastic molding compounds such as polyvinyl chloride, polycarbonates, polystyrene, polymethacrylates, and polypropylene. Disadvantageously, however, overpolymers containing hard cores tend to be undesirable for uses as high impact high rubber content molding resins due to undesirably low flow properties.

In U.S. Pat. No. 3,944,631, an acrylate rubber based overpolymer comprising a crosslinked alkyl acrylate core polymer, a crosslinked styrene/acrylonitrile shell (optionally the core and shell polymers may be reversed), and a non-crosslinked substantially non-grafted styrene/acrylonitrile overcoat was disclosed.

While previously known acrylate rubbers, including overpolymer rubbers, have achieved a degree of success as impact modifiers for injection molding resins, it is still desirable to provide such a resin having even better toughness and gloss properties. Such a resin may be achieved by the use of overpolymer rubbers having improved properties.

SUMMARY OF THE INVENTION

According to the present invention, there are now provided overpolymers comprised of (1) a rubbery alkyl acrylate polymer, (2) a hard crosslinked and grafted overcoat of a polymer having a Tg value of greater than about 20° C., and (3) a hard grafted and uncrosslinked overcoat of a polymer having a Tg value of greater than about 20° C. In a strict sense, the hard overcoats do not form separate encapsulating layers but may instead be thought of as separate components of a hard overcoat layer. Components (2) and (3) may be applied in any order and the relative amounts thereof may be adjusted to achieve the desired ratio of crosslinked to uncrosslinked polymer.

The overpolymers of the invention are useful in providing impact modification of thermoplastic polymers particularly those thermoplastic polymers that are compatible with one or more of the hard overcoat polymers.

DETAILED DESCRIPTION

Rubbery alkyl acrylate polymers are homopolymers or copolymers of $C_{2-10}$ alkyl acrylate monomers optionally and preferably additionally comprising a crosslinker.

If desired, the rubbery alkyl acrylate polymer may additionally comprise in polymerized form up to about 20 percent by weight of one or more monovinylidene comonomers copolymerizable with the alkyl acrylate monomer. Examples of such suitable optional monomers include styrene, acrylonitrile, methacrylonitrile, methylmethacrylate, methacrylic acid, acrylic acid, and so forth.

The rubbery alkyl acrylate polymer is generally prepared according to known techniques of emulsion polymerization. Preferably, there is first prepared a monomer charge comprising an aqueous emulsion containing about 10 percent to about 50 percent by weight total monomers, and from about 0.2 to about 2.0 percent by weight of a suitable emulsifier. From about 0.05 to about 2.0 percent by weight based on the weight of monomer mixture of a water-soluble catalyst such as an ammonium, sodium, or potassium persulfate, hydrogen peroxide, or a redox system, such as a mixture of a persulfate with an alkali metal bisulfite, bisulfate, or hydrosulfite, is introduced, and the mixture is then heated to a temperature of from about 40° to about 95° C. for a period of from about 0.5 to about 8 hours.

In a further desirable embodiment, a seed latex is also employed to produce uniformly sized latex particles. Suitably such seed latexes have a particle size of less than about 500 Angstroms, and preferably less than about 300 Angstroms and comprise polystyrene, polyalkyl acrylate, polymethylmethacrylate, or other suitable thermoplastic or elastomeric polymer. The seed latexes are generally employed in an amount of about 5 percent or less based on monomer weight.

The rubbery alkylacrylate core polymer may additionally comprise a crosslinker. In order to cross-link the alkyl acrylate monomer, up to about 10 percent by weight, preferably from about 0.05 percent to about 5 percent based on monomer weight, of at least one cross-linking agent is used. Suitable crosslinking agents include di- or polyfunctional ethylenically unsaturated monomers having at least one vinyl group. These crosslinking monomers are used to control the percent gel and the swelling index of the rubber according to techniques previously known in the art. Examples of suitable cross-linking monomers include the polyvinyl hydrocarbons and substituted hydrocarbons, monomeric polyesters of a polyhydric alcohol and acrylic or methacrylic acids containing from 2 to 6 polymerizable acrylic acid groups per polyester molecule, and monomeric polyalkenyl polyethers of polyhydric alcohols containing from 2 to 6 polymerizable alkenyl groups per polyether molecule. The polyhydric alcohol used can contain 2 to about 10 carbon atoms. Examples of such compounds include divinyl benzene, divinyl naphthalene, divinyl cyclohexane, diethylene glycol dimethacrylate, trimethylene glycol diacrylate, trimethylene glycoldimethacrylate, butylene glycol diacrylate, butylene glycoldimethacrylate, pentamethylene glycol diacrylate, pentamethylene glycoldimethyacrylate, glyceryl diacrylate, glyeryl triacrylate, trimethylol propane triacrylate, trimethylol propane trimethacrylate, the tetraacrylate ester of pentaerythritol, triallylcyanurate, triallylisocyanurate, and the like. A preferred crosslinking monomer is trimethylol propane triacrylate (TMPTA).

The emulsifier which is used is at least one of the following conventional types: an anionic emulsifier, e.g., the $C_{2-22}$ carboxylic acids, the sulfates or, sulfonates, of $C_{6-22}$ alcohols or alkyl phenols; a non-ionic emulsifier, e.g., the addition products of alkylene oxides to fatty acids, amines, or amides; a combination of the foregoing anionic and non-ionic emulsifiers; or the cationic emulsifiers, e.g., a quaternary ammonium containing compound.

Additional suitable components in the emulsion polymerization include chain transfer agents such as alkyl mercaptans, e.g., tertiary dodecylmercaptan, toluene, xylene, chloroform, halogenated hydrocarbons and the like. In addition, a buffer to control the pH of the emulsion polymerization medium is additionally desirable.

After preparation, the rubbery alkyl acrylate polymer latex may be concentrated and recovered according to well-known techniques or retained in a latex form for subsequent use in preparation of the overpolymer.

In a preferred embodiment of the invention, the rubbery alkyl acrylate polymer possesses a high level of available double bonds that are utilized in the subsequent grafting process. These double bonds may be incorporated throughout the rubbery polymer or may be concentrated in a shell referred to hereinafter as a graft-linkable shell. Double bonds are introduced into the rubbery polymer through the use of graft-linking monomers. Suitable graft-linking monomers for use, in either a graft-linkable shell or a monolithic rubbery particle as above described, can be any copolymerizable comonomer containing at least two olefinic groups, preferably vinyl groups and having up to about 20 carbons therein. Examples include dienes such as butadiene and the like, divinyl cyclic hydrocarbons such as divinyl benzene, divinyl naphthalene, etc. and the like, or preferably graft-linking monomers containing allyl groups or wherein the olefinic groups have different reactivities such that one group will react preferentially to the other. Examples of these monomers are vinyl and allyl esters of unsaturated carboxylic acids, acid anhydrides, and amides containing 3 to about 10 carbon atoms in the acid, anhydride, or amide. Such monomers are illustrated by vinyl acrylate, vinyl methacrylate, allyl acrylate, allyl methacrylate, diallyl itaconate, the monoallyl and diallyl maleates, the monoallyl and diallyl fumarates, diallyl diglycollate, allyl acrylamide, allyl methacrylamide, allyl crotonate, cinnamyl acrylate, crotyl acrylate, crotyL methacrylate, and the like. Examples of the most preferred graft-linking monomers are allyl methacrylate and allyl acrylate. One or more than one graft-linking monomers can be employed. Generally the graft-linking monomer is employed in an amount up to about 20 percent by weight, preferably from about 1 percent to about 10 percent by weight.

Because the above graft-linking monomers additionally may lead to crosslinking reactions, in the preferred embodiment of the invention, the graft-linkable alkyl acrylate polymer is itself crosslinked. Additional crosslinking monomers may, of course, also be employed. Suitable crosslinkers include those additional monomers previously disclosed in regards to the rubbery alkyl acrylate core polymer.

Suitable alkyl acrylate monomers employed to prepare the graft-linkable rubbery layer include the $C_{2-10}$ alkyl acrylate monomers previously disclosed. Preferred alkyl acrylates are n-butyl acrylate and 2-ethylhexylacrylate. In addition to the alkyl acrylate monomer, graft-linking monomer, and optional crosslinking monomer, the graft-linkable shell may additionally comprise up to about 20 percent by weight preferably up to about 10 percent by weight of one or more copolymerizable monovinylidene monomers such as those copolymerizable monomers previously disclosed for use in combination with the alkyl acrylate rubber particle monomer.

The graft-linkable shell is prepared according to known techniques of emulsion polymerization in the presence of a latex of the previously prepared rubbery alkyl acrylate core polymer. Equipment, additional components, and process conditions are as previously disclosed in regards to preparation of the rubbery alkyl acrylate core polymer. The relative proportions of core and shell may range from about 95/5 to about 70/30. After preparation, the compositon having both a core and a shell structure may be recovered and dried prior to addition of the hard crosslinked and grafted overcoat or retained in a latex form prior to such reaction.

The remaining components of the invented composition are hard crosslinked and grafted and grafted but uncrosslinked overcoats of polymers having a Tg value of over about 20° C. Examples of suitable monomers employed to prepare the overcoat polymers include homopolymers and interpolymers of one or more monovinylidene monomers such as methacrylates, including methylmethacrylate, ethyl methacrylate, and the like; vinyl acids including acrylic acid, methacrylic acid, and the like; vinyl esters such as vinyl acetate, vinyl propionate, vinyl butyrate, and the like; vinyl ketones including methylvinyl ketone, propyl vinyl ketone, and the like; vinyl ethers including vinyl methyl ether, vinyl ethyl ether, vinyl isobuteryl ether, and the like; monovinylidene aromatics such as styrene, α-methylstyrene, vinyl toluene, and the like; and nitrile containing monomers including acrylonitriles, methacrylonitrile, and the like.

Preferably, the overcoat polymers are copolymers of styrene and acrylonitrile containing about 10 to about 40 percent by weight acrylonitrile and optionally up to about 50 percent methylmethacrylate. One hard overcoat is both crosslinked to encapsulate the previously prepared rubbery acrylate polymer and grafted to attach the hard overcoat polymer to the rubber particle. Suitable crosslinkers include those comonomers previously mentioned in regard to the rubbery alkyl acrylate polymer. The amount of such crosslinker is generally up to about 10 percent by weight, preferably from about 0.05 to about 5.0 percent by weight. In the second overcoat, an uncrosslinked hard polmer is polymerized and grafted. The ratio of grafted and crosslinked polymer to grafted and uncrosslinked polymer in the hard overcoats is controlled by the amount of monomers polymerized in each step and the conditions used in the grafting steps. It is known that during grafting reactions, not all of the hard polymer formed is grafted to the rubber particle but instead forms a portion of the rigid phase. The hard overcoat polymers may be polymerized in any order. The amount of grafting may be varied to a certain degree by adjusting the polymerization conditions employed in the overcoat polymerization. For example, the use of low levels of a chain transfer agent during the polymerization of the overcoat polymers as well as the use of higher levels of initiator aid in the formation of grafted polymer. In addition, the monomer utilized to form the second overcoat polymer may be different than that initially employed. When desired, a third or even fourth application of hard overcoat polymer may be employed to supply additional grafted hard overcoats of crosslinked or uncrosslinked polymer. In a preferred embodiment the polymerization of uncrosslinked polymer is controlled such that greater than 30 weight percent of the uncrosslinked polymer and preferably greater than 35 weight percent thereof is grafted.

Regardless of the method of its preparation, it is critical to the invention that both crosslinked and uncrosslinked, grafted hard overcoat polymer be present. In the absence of sufficient grafting, it has been discovered that despite the fact that the rubber particles possess an overpolymer structure, the resulting elastomer does not provide suitable gloss properties. In particular, the surface gloss of such resins is undesirably sensitive to molding conditions. Preferably, the ratio of grafted hard overcoats to insoluble rubber in the overpolymers of the invention is at least about 0.05, preferably at least about 0.10. The maximum ratio is generally on the order of about 5.0, preferably less than about 1.0.

The applications of the hard crosslinked and grafted overcoat polymers and hard uncrosslinked and grafted overcoat polymers are achieved by the use of emulsion polymerization techniques such as those previously disclosed. The resulting latex is coagulated, dewatered, dried, and recovered utilizing well known techniques.

The overpolymer acrylate rubbers may be prepared in any suitable size. Generally a small diameter particle having a volume average particle size from about 500 Angstroms to about 2,000 Angstroms is employed to produce improved surface gloss of molded thermoplastic objects while large diameter particles having a volume average particle size from about 3,500 Angstroms to about 8,000 Angstroms are usefully employed to provide impact modification of such resins. Desirably, a combination of both large and small size particles may be added to various thermoplastic resins particularly copolymers of styrene and acrylonitrile as well as polyvinylchloride, polymethylmthacrylate, polystyrene, polycarbonate or blends thereof. The rubbers are incorporated into such polymers or blends by techniques well known in the art. In a particularly preferred embodiment, the overpolymer acrylate rubbers of the invention are first dry mixed and then melt blended into the thermoplastic resin. Additional grafted modifiers such as weatherable rubbers prepared by copolymerization of ethylene and an α-olefin such as propylene optionally in the additional presence of a diene monomer, or conventional diene rubbers such as polymers of butadiene and copolymers thereof with copolymerizable comonomers such as styrene may additionally be blended into the thermoplastic resin.

SPECIFIC EMBODIMENTS

Having described the invention, the following examples are provided as further illustrative and are not to be construed as limiting. Where indicated percentages and parts are based on weight.

Small Particle Size Core Rubber

Step 1

In a 1-gallon glass pipe reactor was placed 1250 g $H_2O$, 3.00 g $NaHCO_3$, 1.7 ml acetic acid, and 27.3 g of 300 Å polystyrene seed latex (ca 33 percent active). The contents were evacuated and purged twice with nitrogen and then a solution of 1.00 g sodium formaldehyde sulfoxolate in 100 g $H_2O$ was added. The reactor was heated to 65° C. while agitating at 150 rpm. When the temperature reached 65° C., an aqueous continuous addition (conadd) stream was started which contained 0.589 percent $Na_2S_2O_8$, 4.26 percent active Calsoft ® brand sodium dodecyl benzene sulfonate surfactant and the balance $H_2O$. Five minutes later, a monomer stream containing 99.5 percent n-butyl acrylate, 0.5 percent trimethylopropane triacrylate and about 65 ppm monomethyl ether of hydroquinone inhibitor (present in the monomers during transport) was started. 1000 g of monomers were added over a 5 hour period and 848 g of aqueous conadd stream was added over a 5⅓ hour period. The latex was cooked for 3 hours after the aqueous conadd stream had finished. The final conversion was 95.6 percent (31.6 percent solids) and the latex had a particle size of 1450 Å. This core rubber is resistant to grafting and when grafted directly provides ASA resins with low graft levels (low G/R).

Comparative Resin 1, Step 2, Small Particle Resin (Step 1) Additionally Comprising Crosslinked SAN Into a 1-gallon glass reactor was placed 2648 g of 1450 Å butyl acrylate core latex (800 g rubber) prepared in step 1 and 100 g $H_2O$. The reactor was purged of oxygen and heated to 70° C. while agitating. To the reactor, an aqueous conadd mixture and a monomer mixture were added. The aqueous solution contained 0.98 percent active Calsoft ® brand surfactant and 99.02 percent water and was added at a rate of 200 g/hour for 2.58 hours (516 g total). The monomer mixture contained 75.0 percent styrene, 24.0 percent acrylonitrile, and 1.0 percent trimethylol propane tracrylate crosslinker and was added at a rate of 258 g/hour for 2.0 hour (516 g total). The latex was cooked for 1.75 hours at 70° C. and a portion of the product then removed and steam stripped to remove residual monomers. The stripped latex was stabilized with antioxidants and isolated by freeze coagulation. Conversion was quantitative and the resin contained 60.8 percent rubber. No uncrosslinked (linear) rigid phase was prepared and therefore, the grafted SAN/insoluble rubber ratio was 0. By extraction in methyl ethyl ketone, it was determined that this resin had a gel content of 89.7 percent and the ratio of crosslinked SAN/insoluble rubber was 0.72 in the gel. The ratio of grafted SAN-rubber was less than 0.01.

Comparative Resin 1, Step 3, Resin of Comparative Resin 1, Step 2, Additionally Comprising Ungrafted SAN Into a glass reactor was placed 1917 g of the above latex (containing 406 g of 1450 Å butyl acrylate rubber and 262 g of crosslinked SAN). The latex was heated to 70° C. while being agitated. An aqueous conadd mixture containing 0.98 percent active Calsoft ® brand surfactant and 99.02 percent water was added at a rate of 193 g/hour for 2.5 hours (193 g total) and a monomer mixture containing 74.8 percent styrene, 24.9 percent acrylonitrile, and 0.50 percent n-octyl mercaptan was added at a rate of 151 g/hour for 2 hours (302 g total). The latex was heated for an additional 1.75 hours, steam stripped to remove residual monomers, stabilized with antioxidants, and freeze coagulated to isolate the rubber concentrate. The final rubber concentrate contained 43.0 percent rubber, 27.8 percent crosslinked SAN shell, and 29.2 percent uncrosslinked SAN overcoat.

Methyl ethyl ketone extraction of the resin showed the percent gel to be 64.2 percent and the ratio of crosslinked SAN+grafted SAN/insoluble rubber ratio to be 0.74. The ratio of grafted SAN/rubber was 0.02, i.e., 2 percent graft. Three weight percent of the uncrosslinked SAN formed during the polymerization was grafted.

Example 1, Step 2, Resin of Step 1, Additionally Comprising Graft-Linkable Shell The rubber latex from step 1 (3181 g) was heated to 65° C. A monomer mixture of n-butyl acrylate-allyl methacrylate (95/5) and an aqueous stream containing 0.0589 $Na_2S_2O_8$ and 4.26 percent active Calsoft® brand surfactant were added simultaneously. 260 g of the monomer mixture was added over a 1 hour period and 338 g of the aqueous conadd stream were added over a 2 hour period. This latex was retained at 65° C. for 2 hours after the aqueous conadd had finished. The final core/shell particle size was 1569 Å and the conversion was 99.1 percent (34.3 percent solids). The core/shell rubber had a swelling index in methyl ethyl ketone of 11.5 and a gel content of 89.1 percent.

Example 1, Step 3, Resin of Example 1, Step 2, Additionally Comprising Grafted and Crosslinked Hard Overcoat The latex of Example 1, Step 2, having a graft-linkable shell (500 g rubber solids) was placed into a glass reactor. The contents were degassed and heated to 85° C. while being agitated. Over 3.5 hours, an aqueous conadd mixture containing 0.214 percent $Na_2S_2O_8$ and 1.43 percent active Calsoft® brand surfactants was added at a rate of 124 g/hour (434 g total). At the same time a monomer mixture containing 75 percent styrene, 24 percent acrylonitrile, and 1.0 percent trimethylol propane triacrylate was added at a rate of 96.6 g/hour for 3.5 hours (338 g total). The resulting latex was heated for 0.5 hour at 85° C. Analysis indicated a solid content of 35.6 percent, and a conversion of 97.4 percent. The rubber content in the modifier including both the core and graft-linkable shell was 60.3 percent. The gel content was 85.3 percent. The ratio of crosslinked SAN/insoluble rubber was 0.61.

Example 1, Step 4, Resin of Example 1, Step 3, Additionally Comprising Grafted Uncrosslinked Overcoat A second overpolymer having an additional quantity of grafted SAN overpolymer was prepared. To the latex prepared in Example 1, Step 3, at 85° C. was added a monomer mixture of 74.9 percent styrene, 25.0 percent acrylonitrile, and 0.08 percent n-octyl mercaptan at a rate of 86.9 g/hour for 3.5 hours (304 g total). Simultaneously, an aqueous mixture was added comprising 0.214 percent $Na_2S_2O_8$, 1.43 percent active Calsoft® brand surfactant, and the balance H2O at a rate of 119.4 g/hour for 3.5 hours (418 g total). The latex was retained at 85° C., an additional 0.5 hour. The resulting latex having a solid content of 38 percent was steam stripped, stabilized with antioxidants, and isolated by freeze coagulation. The final dried grafted rubber concentrate contained 43.8 percent rubber. The gel content as measured in methyl ethyl ketone was 72.5 percent and the ratio of crosslinked+grafted SAN/insoluble rubber was 0.86. The grafted SAN/insoluble rubber ratio in this modifier was 0.25 (25 percent graft).

Example 2 Overpolymer Preparation by Reversed Two Step Addition of Overcoat

The latex containing rubber particles having a graft-linkable shell prepared in Example 1, Step 2 (1625 g) was placed into a glass reactor. The reactor was purged of oxygen and heated to 85° C. with agitation. Over a 3.5 hour period, an aqueous mixture of 0.214 percent $Na_2S_2O_8$, 1.43 percent active Calsoft® soap, and the balance $H_2O$, was added at a rate of 122.3 g/hour (428 g total). During the same period, a monomer mixture of 74.9 percent styrene, 25.0 percent acryonitrile, and 0.08 percent n-octyl mercaptan was added at a rate of 91.9 g/hour for 3.5 hour (322 g total) to form an uncrosslinked grafted overcoat. The latex was retained at 85° C. an additional 0.5 hour. The latex was found to have a solid content of 36.0 percent (99+ percent conversion) and a rubber content of 60.8 percent. The ratio of grafted SAN/insoluble rubber in the insoluble gel was 0.19.

Crosslinked, grafted overcoat polymer was added by additionally charging a monomer mixture consisting of 75.0 percent styrene, 24.0 percent acrylonitrile, and 1.0 percent trimethylol propane triacrylate at a rate of 91.9 g/hour for 3.5 hours (322 g total) at 85° C. An aqueous mixture containing 0.214 percent $Na_2S_2O_8$, 1.43 percent active Calsoft® brand surfactant, and the balance of $H_2O$ was added at a rate of 118.3 g/hour during the same time period (414 g total). The latex was retained at 85° C. an additional 0.5 hour, steam stripped, and stabilized with antioxidants. The solids content of the resulting overpolymer was 38.1 percent. The rubber content was 43.7 percent. The gel content in methy ethyl ketone was 64.1 percent gel and the ratio of crosslinked SAN+grafted SAN/insoluble rubber in the insoluble gel was 0.65. The ratio of grafted SAN/rubber remained at 0.19. Thirty weight percent of the uncrosslinked SAN formed during the polymerization was grafted.

Large Particle Core Rubber

Step 1

Into a 20-gallon glass-lined reactor was placed 33,234 g of $H_2O$, 30.0 g of sodium formaldehyde sulfoxolate, 69.0 g of acetic acid, 45.0 g of $NaHCO_3$, and 583 g of polybutyl acrylate seed latex (ca 1000 Å, 37 percent active). The contents were purged of oxygen and heated to 65° C. To the agitated mixture at 65° C. was added 79,545 g of an aqueous mixture containing 0.050 percent $Na_2S_2O_8$, 1.29 percent active Calsoft® brand surfactant, and the balance $H_2O$. This material was added at 11,716 g/hour for 4.0 hours and 21,787 g/hour for 1.5 hour. During the same period, a monomer mixture of 99.75 percent butyl acrylate and 0.25 percent trimethylol propane triacrylate was added at a rate of 2081 g/hour for 1.5 hour and then 9306 g/hour for 3.0 hours. The latex was retained at 65° C. for an additional 1.0 hour. The solids content of the resulting latex was 36.7 percent, the volume average particle size (Dv) was 0.54 μm, and the dried core particle had a swelling index in methyl ethyl ketone of 10.5 and a gel content of 96.9 percent.

Comparative Resin 2, Step 2

The large particle core rubber latex (1974 g, 750 g rubber) was placed into a glass reactor along with 0.610 g $Na_2S_2O_8$ and 100 g of $H_2O$. The reactor was purged of $O_2$, and heated to 70° C. while being agitated. To this latex was added 264 g of a mixture of styrene, acrylonitrile and trimethylol propane triacrylate in the ratio 74/25/1.0 over a 2.0 hour period and 400 g of an aqueous conadd stream comprising Calsoft° brand surfactant and water (0.66 percent active soap) over a 2.5 hour period. The latex was heated at 70° C. an additional 1.5 hours after the aqueous conadd stream was discontinued. Analysis of a sample indicated the conversion of monomers was 98.2 percent and the resin contained 74.3 percent rubber. The gel content of the resin was 95.8 percent using methyl ethyl ketone extraction and the ratio of crosslinked SAN to rubber was 0.29. Since no additional SAN was polymerized, the ratio of grafted SAN/rubber was 0.0.

Comparative Resin 2, Step 3

To the latex prepared in Comparative Resin 2, Step 2, was added 282 g of a monomer mixture of styrene, acrylonitrile and n-octylmercaptan in the ratio (74.875/24.9/0.3) over a 2.0 hour period and 430 g of the aqueous mixture from above over a 2.5 hour period. The latex was retained at 70° C. an additional 1.5 hour after the aqueous conadd stream was discontinued. The latex was then steam stripped, stabilized with antioxidants, and isolated by freeze coagulation. The solids content of the latex was 37.4 percent and the conversion of monomers was 94.0 percent. The final resin contained 58.6 percent rubber, 20.3 percent crosslinked SAN and 21.1 percent uncrosslinked SAN. Three weight percent of the uncrosslinked SAN formed during the polymerization was grafted. Methyl ethyl ketone extraction of the final product showed the gel content to be 75.9 percent. The ratio of crosslinked SAN+grafted SAN/rubber was 0.30. The ratio of grafted SAN/rubber was 0.01.

Example 3, Step 2, Large Particle Resin (Step 1) Having Graft-Linkable Shell The large particle rubber core prepared in Step 1 above (39,885.1 g, 15,042 g rubber solids) was charged to a reactor. The latex was heated to 65° C. and 2208 g of an aqueous solution containing 0.048 percent $Na_2S_2O_8$, 1.39 percent active Calsoft ® brand surfactant, and the balance $H_2O$ was added over a 2.0 hour period. Started at the same time, 1697 g of a monomer mixture containing 95.0 percent butyl acrylate and 5.0 percent allyl methacrylate was added over a 1.0 hour period. After discontinuation of the feed streams, the latex was heated an additional 1.0 hour. The solids content of the resulting latex was 37.0 percent, the volume average particle size (Dv) was 0.56 μm. The rubber had a swelling index of 6.3, and a gel content of 96.5 percent as measured in methyl ethyl ketone.

Example 3, Step 3, Resin of Example 3, Step 2, Additionally Comprising Grafted Uncrosslinked SAN The latex from Example 3, Step 2 (1335 g. 500 g, rubber solids) was placed into a glass reactor along with 100 g of $H_2O$. The reactor was purged of oxygen and heated to 85° C. while agitating. To the reactor was added over a 3 hour period, 202 g of a monomer mixture containing 74.9 percent styrene, 25.0 percent acrylonitrile, and 0.075 percent n-octyl mercaptan. Over the same 3 hour period, 400 g of an aqueous solution containing 0.22 percent $Na_2S_2O_8$ and 0.74 percent active Calsoft ® brand surfactant was added. The latex was retained at 85° C. an additional 0.5 hour, after which time the conversion was 96.2 percent and the solids content was 37.0 percent. The dry resin had a rubber content of 73.0 percent and a gel content of 81.0 percent in methyl ethyl ketone. The ratio of grafted SAN/insoluble rubber in the insoluble gel was 0.16. Fortythree weight percent of the uncrosslinked SAN formed during the polymerization was grafted.

Example 3, Step 4, Resin of Example 3, Step 3, Additionally Comprising Grafted Crosslinked SAN To the latex of Example 3, Step 3, having a first overcoat of grafted uncrosslinked hard polymer were added at 85° C. over a 2.28 hour period 152 g of a monomer mixture containing 75.0 percent styrene, 24.0 percent acrylonitrile, and 1.00 percent trimethylol propane triacrylate crosslinker. Over the same period of time, 192 g of the same aqueous mixture used for the grafted uncrosslinked SAN was added. This latex was heated an additional 0.5 hour, steam stripped, stabilized with antioxidants, and isolated by freeze coagulation. The solids content of the latex was 38.25 percent, conversion was 96.3 percent and the overpolymer contained 58.9 percent acrylate polymer, 22.9 percent uncrosslinked SAN, and 18.2 percent crosslinked SAN. The gel content of the overpolymer was 78.6 percent as measured in methyl ethyl ketone, and the insoluble gel had a ratio of grafted SAN+crosslinked SAN/insoluble rubber of 0.37. The ratio of grafted SAN/insoluble rubber remained at 0.16.

Testing

The above prepared butyl acrylate-overpolymers were blended in various proportions with other resins by dry mixing and then melt mixing in a 0.8 inch Welding Engineers Twin-Screw Extruder at temperatures between 165° C. and 204° C. The resins were then dried at 80° C. for 4+ hours and injection molded on a 2-oz Negri Bossi molding machine. Both tensile specimens and 2"×⅛" disks were molded. Physical properties were determined on the tensile bar specimen when molded at 425°/450° F. barrel temperature, 110° F. mold temperature, 800/600 psi injection/hold pressure. The appearance of the resins and appearance sensitivity to molding conditions were determined when molding with a barrel temperature of 500°/500° F. and a mold temperature of 120° F. At these conditions, the injection pressure was varied from 800 psi (full shot) to 200 psi (short shot), while the hold pressure was reduced to zero. At short shot, the tensile bar is about 0.5 inches short of filling, while the 2"×⅛" chip fills the mold. The gloss is then measured on the chip. Resins having gloss that is less sensitive to molding pressures are very desirable since molded articles will have more uniform gloss throughout the part. This test simulates the changes in pressure that might be present in different locations of a larger part. Results of appearance testing are contained in Table I. Physical properties are provided in Table II.

TABLE I
Blends of ASA Resins and SAN[1]

| Blend # | Composition | Ratio Grafted SAN/—Insoluble Rubber | % Gloss[2] 800 psi | % Gloss[2] 200 psi |
|---|---|---|---|---|
| 1[3] | 24.7% Comparative Resin 1, Step 2 75.3% SAN[4] | 0 | 95 | 81 |
| 2[3] | 35.8% Comparative Resin 1, Step 3 64.2% SAN[4] | .02 | 94 | 87 |
| 3 | 34.3% Resin from Example 2 65.7% SAN[4] | .19 | 93 | 91 |
| 4 | 34.2% Resin From Example 1 Step 4 65.8% SAN[4] | 0.25 | 93 | 91 |

[1]All blends contain 15% acrylate rubber
[2]60° Gardner Gloss of 2" × ⅛" specimens made at specified molding conditions
[3]Not examples of the present invention
[4]Tyril ® 125 brand styrene/acrylonitrile resin available from The Dow Chemical Company The data in Table I show the improved gloss and lack of sensitivity to molding pressure obtained with a blend containing an acrylate rubber overpolymer wherein the overcoat comprises both grafted, as well as crosslinked rigid phase.

TABLE II
Blends of AES and ASA Resins[1]

| Blend | Composition | Notched[2] Izod | Ratio Grafted SAN/Insoluble Rubber in Overpolymer Rubber |
|---|---|---|---|
| 5[3] | 24.7% Comparative Resin 1, Step 2 43.5% AES[4] 31.8% SAN[5] | 6.8 | 0 |
| 6[3] | 35.8% Comparative Resin 1, Step 3 43.5% AES[4] 20.7% SAN[5] | 7.5 | 0.02 |
| 7 | 34.3% Resin of Example 2 43.5% AES[4] 22.2% SAN[5] | 8.2 | 0.19 |
| 8 | 34.2% Resin of Example 1 Step 4 43.5% AES[4] 22.5% SAN[5] | 8.3 | 0.25 |

[1]All blends contain 10% EPDM rubber and 15% acrylate rubber
[2]Ft-lbs/inch of notch
[3]Not examples of the present invention
[4]Rovel ® 401 brand EPDM modified SAN resin available from The Dow Chemical Company
[5]Tyril ® 125 brand styrene/acrylonitrile resin available from The Dow Chemical Company The above results show the improved toughness obtained from blends of AES resins and acrylate elastomers where the acrylate elastomer contains higher levels of grafted as well as crosslinked overcoat hard polymer.

Similar blends are prepared utilizing large size overpolymer rubbers as the sole modifier of an SAN resin. Physical properties of blends containing 30 weight percent acrylate rubber are tested on samples prepared as in Table II. Results are provided in Table III.

TABLE III

| Blend | Composition | Notched[1] Izod | Grafted Ratio of Rigid Phase/Insoluble Rubber in Acrylate Resin |
|---|---|---|---|
| 9 | 50.9% of overpolymer from Example 3, Step 3 49.1% SAN[2] | 7.5 | 0.16 |
| 10[3] | 51.2% of Comparative Resin 2, Step 3 48.8% SAN[2] | 2.8 | 0.01 |

[1]Ft-lbs/inch of notch
[2]Tyril ® 111 brand styrene acrylonitrile resin available from The Dow Chemical Company
[3]Not an example of the invention The results of Table III show the improved toughness of large particle acrylate rubber modified resins where the rubber is an overpolymer rubber having both crosslinked rigid phase and high levels of grafted overcoat polymer.

Additional samples of resins containing both large and small particle overpolymer rubbers are prepared and tested as in Table II. Results are provided in Table IV.

TABLE IV
Blends[1] of Large and Small Overpolymer Resins

| Blend # | Composition | Notched Izod[2] |
|---|---|---|
| 11[3] | 25.6% Comparative Resin 2, Step 3 34.9% Comparative Resin 1, Step 3 39.5% SAN 111[4] | 7.2 |
| 12 | 12.7% Overpolymer Resin of Example 3, Step 4 51.5% Overpolymer Resin of Example 2 with reversed two step addition of overcoat 35.8% SAN 111[4] | 8.0 |

[1]All blends contain 30% acrylate rubber
[2]Ft-lbs/inch of notch
[3]Not an example of the present invention
[4]Tyril ® 111 brand styrene acrylonitrile resin available from The Dow Chemical Company The results of Table IV show that better toughness is obtained in a resin modified with overpolymer rubber of two particle sizes if the rubber contains both crosslinked rigid overcoat and high levels of grafted rigid overcoat.

What is claimed is:

1. A composition of matter in the form of an overpolymer comprising (1) a rubbery alkyl acrylate polymer, (2) a crosslinked and grafted overcoat of a polymer having a Tg value of greater than about 20° C., and (3) a grafted and uncrosslinked overcoat of a polymer having a Tg value of greater than about 20° C. said overcoat polymers comprising copolymers of styrene and acrylonitrile containing from about 10 to about 40 weight percent acrylonitrile and from 0 to 50 weight percent methylmethacrylate and wherein in the polymerization of said uncrosslinked overcoat, greater than 30 percent of the polymer is grafted.

2. A composition according to claim 1, wherein the alkyl acrylate is a $C_{2-10}$ alkyl acrylate.

3. A composition according to claim 1, wherein the rubbery alkyl acrylate polymer comprises a homopolymer of an alkyl acrylate or a copolymer thereof with up to about 20 percent by weight of one or more monovinylidene comonomers copolymerizable therewith.

4. A composition according to claim 1, wherein the rubbery alkyl acrylate polymer additionally comprises up to about 10 percent by weight of a crosslinker.

5. A composition according to claim 4, wherein the crosslinker is trimethylol propane triacrylate.

6. A composition according to claim 1, wherein the rubbery alkyl acrylate polymer comprises a crosslinked rubbery core and a graft-linkable rubbery shell, said rubbery shell further comprising a polymer of a $C_{2-10}$ alkyl acrylate and up to about 20 percent by weight of a copolymerizable comonomer containing at least two olefinic groups.

7. A composition according to claim 6, wherein the copolymerizable comonomer comprises allyl methacrylate or allyl acrylate.

8. A composition according to claim 6, wherein the alkyl acrylate is n-butyl acrylate or 2-ethylhexyl acrylate.

9. A composition according to claim 1, wherein the hard crosslinked and grafted overcoat additionally comprises up to about 10 percent by weight of a crosslinker.

10. A composition according to claim 9, wherein the crosslinker is trimethylol propane triacrylate.

11. A composition according to claim 1, wherein the ratio of grafted overcoat polymers to insoluble rubber is at least about 0.05.

12. A composition according to claim 11, wherein the ratio of grafted overcoat polymers to insoluble rubber is at least about 0.1.

* * * * *